(12) United States Patent
Murakami (10) Patent No.: US 7,938,995 B2
(45) Date of Patent: May 10, 2011

(54) METHOD FOR MANUFACTURING SUBSTRATE FOR DISPLAY PANEL

(75) Inventor: Kenichi Murakami, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 12/728,132

(22) Filed: Mar. 19, 2010

(65) Prior Publication Data

US 2010/0173129 A1 Jul. 8, 2010

Related U.S. Application Data

(63) Continuation-in-part of application No. PCT/JP2008/059765, filed on May 28, 2008.

(30) Foreign Application Priority Data

Sep. 19, 2007 (JP) ................................ 2007-242053

(51) Int. Cl.
B29C 45/16 (2006.01)
(52) U.S. Cl. .................... 264/104; 264/328.12
(58) Field of Classification Search .................. 264/104, 264/328.12; 428/156
See application file for complete search history.

(56) References Cited

U.S. PATENT DOCUMENTS 5,618,567 A * 4/1997 Hara et al. ..................... 425/111
5,956,112 A * 9/1999 Fujimori et al. .............. 349/156
6,525,865 B2 2/2003 Katase

FOREIGN PATENT DOCUMENTS

| JP | H11-339646 | A | 12/1999 |
| JP | 2000-098352 | A | 4/2000 |
| JP | 2001-343672 | A | 12/2001 |
| JP | 2005-019025 | A | 1/2005 |
| JP | 2006-059706 | A | 3/2006 |

OTHER PUBLICATIONS

Japanese Patent Office, International Search Report for International Application No. PCT/JP2008/059765, mailed Sep. 2, 2008.

* cited by examiner

Primary Examiner — Jill L Heitbrink
(74) Attorney, Agent, or Firm — Baker Botts L.L.P.

(57) ABSTRACT

There is provided a method for manufacturing a substrate for a display panel including a rib and a flat surface (hereinafter referred to as "substrate surface") formed on one surface, the substrate surface being the region other than the rib in the substrate and including an electrode provided thereon, the substrate having a convex/concave shape (hereinafter referred to as "a substrate convex/concave shape") composed of the rib and the substrate surface, comprising: a step 1 for positioning a mold having a convex/concave shape (hereinafter referred to as "a mold convex/concave shape") that is reversed to the substrate convex/concave shape so that the mold convex/concave shape and the substrate convex/concave shape are fitted to each other, the mold being provided with a flat surface (hereinafter referred to as "a mold convex surface") facing to the substrate surface at a convex portion of the mold convex/concave shape, and with a surface (hereinafter referred to as "a mold concave bottom surface") facing to a top surface of the rib (hereinafter referred to as "a rib top surface") at a concave portion of the mold convex/concave shape; a step 2 performed after the step 1, for injecting an electrode material from an injection inlet opened on the mold convex surface; and a step 3 performed after the step 2, for solidifying the electrode material and detaching the mold from the substrate.

13 Claims, 6 Drawing Sheets

Step 1    (a) Alignment: fitting the mold convex/concave shapes into the substrate convex/concave shapes (b) Arranging the distance between the mold convex surface and the substrate surface at the electrode thickness t Step 2    (c) Injecting the electrode material from the injection inlet Step 3    (d) Solidifying the electrode material and detaching the mold

Step 0    (a) Filling the injection inlet with the resin (b) Forming the substrate having the convex/concave shapes (ribs) by stamping (c) Removing the filled resin

Fig. 5

Step 1 (a) Moving the mold convex surface or the substrate surface up and down to form a clearance Step 2 (b) Injecting the electrode material from the injection inlet Step 3 (d) Solidifying the electrode material and detaching the mold

Fig. 12

METHOD FOR MANUFACTURING SUBSTRATE FOR DISPLAY PANEL

Cross-Reference To Related Applications

This application is the Continuation-In-Part of International Patent Application No. PCT/JP2008/059765, filed May 28, 2008, which claims the benefit of Japanese Patent Application No. 2007-242053, filed Sep. 19, 2007, the disclosures of which are incorporated herein by reference in their entirety.

TECHNICAL FIELD

The present invention relates to a method for manufacturing a substrate for a display panel with an electrode on a substrate surface partitioned by ribs, and relates to a display panel provided with the substrate for a display panel manufactured by this method and a display device provided with this display panel.

BACKGROUND ART

A variety of display panels including electrophoretic display panels and liquid crystal display panels become prevalent recently, and also substrates for use in such display panels are widely used. The substrate for the display panel is often provided with an electrode for applying predetermined voltage and current within the substrate filled with, for example, a display liquid such as ink for the electrophoresis and a liquid crystal, toner, or a luminous body, as well as a rib for partitioning a display part into predetermined regions.

Various methods have been proposed for manufacturing a substrate for a display panel with an electrode on a substrate surface of the substrate partitioned by ribs. In such manufacturing methods, there is proposed, for example, a method for manufacturing a substrate for a display panel in which ribs are formed integrally with the substrate by pressing a stamper onto the substrate.

In a conventional manufacturing method, although it is possible to form the substrate with the ribs at a low manufacturing cost by using the stamper, the electrode must be provided on the backside of the substrate, considering the damage to the electrode due to the press of the stamper. In this case, however, the distance between the electrodes increases by the thickness of the substrate and the voltage loss will occur, so that a high voltage will be required for displaying.

DISCLOSURE OF THE INVENTION

The object of the present invention is thus to solve the problem described above and to provide a method for manufacturing a substrate for a display panel with an electrode on a substrate surface of the substrate partitioned by ribs, and to provide a display panel provided with the substrate for a display panel manufactured by the method and a display device provided with the display panel.

To solve the problem described above, one aspect of a method for manufacturing a substrate for a display panel of the present invention is a method including a rib and a flat surface (hereinafter referred to as "substrate surface") formed on one surface, the substrate surface being the region other than the rib in the substrate and including an electrode provided thereon, the substrate having a convex/concave shape (hereinafter referred to as "a substrate convex/concave shape") composed of the rib and the substrate surface, comprising: a step 1 for positioning a mold having a convex/concave shape (hereinafter referred to as "a mold convex/concave shape") that is reversed to the substrate convex/concave shape so that the mold convex/concave shape and the substrate convex/concave shape are fitted to each other, the mold being provided with a flat surface (hereinafter referred to as "a mold convex surface") facing to the substrate surface at a convex portion of the mold convex/concave shape, and with a flat surface (hereinafter referred to as "a mold concave bottom surface") facing to a top surface of the rib (hereinafter referred to as "a rib top surface") at a concave portion of the mold convex/concave shape; a step 2 performed after the step 1 for injecting an electrode material from an injection inlet opened on the mold convex surface; and a step 3 performed after the step 2 for solidifying the electrode material and detaching the mold from the substrate

DETAILED DESCRIPTION OF THE INVENTION

General Description

A first embodiment of a method for manufacturing a substrate for a display panel of the present invention is a method including a rib and a flat surface (hereinafter referred to as "substrate surface") formed on one surface, the substrate surface being the region other than the rib in the substrate and including an electrode provided thereon, the substrate having a convex/concave shape (hereinafter referred to as "a substrate convex/concave shape") composed of the rib and the substrate surface, comprising: a step 1 for positioning a mold having a convex/concave shape (hereinafter referred to as "a mold convex/concave shape") that is reversed to the substrate convex/concave shape so that the mold convex/concave shape and the substrate convex/concave shape are fitted to each other, the mold being provided with a flat surface (hereinafter referred to as "a mold convex surface") facing to the substrate surface at a convex portion of the mold convex/concave shape, and with a flat surface (hereinafter referred to as "a mold concave bottom surface") facing to a top surface of the rib (hereinafter referred to as "a rib top surface") at a concave portion of the mold convex/concave shape; a step 2 performed after the step 1 for injecting an electrode material from an injection inlet opened on the mold convex surface; and a step 3 performed after the step 2 for solidifying the electrode material and detaching the mold from the substrate.

In the substrate for a display panel manufactured according to the embodiment, the substrate surface is partitioned by the ribs, thereby, for example, preventing uneven distribution of particles or the like in a display medium to achieve a clear displaying. The electrodes being arranged on the substrate surface that is partitioned by the ribs includes both the case in which the electrodes in the regions partitioned by the ribs are electrically coupled with one another thereby performing as a common electrode, and the case in which the electrodes in the regions partitioned by the ribs are not electrically coupled with one another thereby performing as separate electrodes. Also, when the electrodes in the regions partitioned by the ribs perform as the separate electrodes, it may be considered that one electrode is placed in each region partitioned by a rib (i.e., each pixel is partitioned by the ribs), and also it may be considered that a plurality of electrodes are placed in a region partitioned by the ribs (i.e., a plurality of pixels is partitioned by the ribs). A plurality of electrodes being placed in each region partitioned by the ribs can be achieved, for example, by providing a plurality of injection inlets in one region surface partitioned by the ribs.

Furthermore, the substrate surface, which is a region other than the rib, includes not only the display region partitioned by the ribs, but also space regions, if such spaces are provided between the ribs.

A "mold convex surface" has a flat shape, and a "mold concave bottom surface" may have both flat and curved shapes. Further, a "substrate surface" has a flat shape, and a "rib top surface" may have both flat and curved shapes.

The aspect of fitting the mold convex/concave shapes to the substrate convex/concave shapes includes both the case in which a convex/concave-shaped side surface of the mold and a convex/concave-shaped side surface of the substrate are fitted with each other without a space therebetween, and the case in which a convex/concave-shaped side surface of the mold and a convex/concave-shaped side surface of the substrate are fitted with each other having a certain space therebetween.

The aspect of positioning the mold as facing to the substrate includes both the case in which the concave bottom surface of the mold and the rib top surface contact with each other, and the case in which they do not contact with each other. Furthermore, it is preferable to provide a certain space between the mold convex surface and the substrate surface in consideration of the injection of the electrode material.

Moreover, the substrate having convex/concave shapes of the substrate used at step 1 can be formed using any methods. For example, a stamping mold can be used for forming (imprint); machining can be done for forming; and etching and ink jetting can be used for forming. In addition, when the stamping mold is used for forming, it can be considered that the mold for forming the electrode used at the step 1 will be used as the stamping mold, as described below.

In this embodiment, the mold having convex/concave shapes of the mold is positioned as facing to the substrate so as to fit to convex/concave shapes of the substrate, and the electrode material is injected from the injection inlet opened on the mold convex surface, thereby enabling the electrode to be provided on the substrate surface partitioned by the ribs. The substrate for the display panel can be thus manufactured in which the electrode is provided on the substrate surface partitioned by the ribs.

The second embodiment of the method for manufacturing a substrate for a display panel according to the present invention is the manufacturing method in which the electrode material is injected from the injection inlet with a predetermined amount at the step 2.

In this embodiment, it is possible to easily and reliably control the thickness of the electrode to a desired value by adjusting the amount of the electrode material to be injected.

The third embodiment of the method for manufacturing a substrate for a display panel according to the present invention is the manufacturing method in which a pressure of injection of the electrode material from the injection inlet is measured and injection of the electrode material is stopped when the measured pressure reaches a predetermined value at the step 2.

In this embodiment, the conditions for injecting the electrode material such as the composition of the electrode material, the temperature of the material, or the like, are made constant, so that the electrode can always be formed having a constant thickness. Therefore, it is possible to easily and reliably control the thickness of the electrode to a desired value by adjusting the pressure of injecting the electrode material.

The fourth embodiment of the method for manufacturing a substrate for a display panel according to the present invention is the manufacturing method in which the mold and the substrate are arranged so as to face to each other on the condition that the mold convex surface and the substrate surface are positioned apart from each other at a predetermined distance at the step 1.

In this embodiment, it is possible to easily and reliably control the thickness of the electrode to a desired value by adjusting the distance between the mold convex surface and the substrate surface. In addition, while a degree of shrinkage of the liquid material for the substrate may be extremely small when solidifying, the distance between the mold convex surface and the substrate surface can be set considering the shrinkage of the substrate material.

The fifth embodiment of the method for manufacturing a substrate for a display panel according to the present invention is the manufacturing method in which a spacer is used for setting the distance between the mold convex surface and the substrate surface to the predetermined distance at the step 1.

In this embodiment, for example, a spacer having a predetermined thickness can be inserted between the rib top surface and the mold concave bottom surface, or can be inserted between the substrate surface and the mold convex surface. Furthermore, it is possible that the spacer having a predetermined thickness is placed on a certain surface on which the substrate is installed, and then the mold is put thereon. In this case, when the stamper or the like is used to form the rib, the spacer having a predetermined thickness can be formed at the same time. The thickness of the spacer can be arbitrarily determined corresponding to the position to place the spacer, the dimensions of the mold, the thickness of the electrode to be formed, or the like.

In this embodiment, it is possible to easily set the distance between the mold convex surface and the substrate surface to a predetermined value by using the spacer.

The sixth embodiment of the method for manufacturing a substrate for a display panel according to the present invention is the manufacturing method in which, at the step 1, the mold is arranged as facing to the substrate so that the rib top surface and the mold concave bottom surface come into contact with each other using the mold in which the distance in the direction perpendicular to the mold convex surface between the mold convex surface and the mold concave bottom surface is the distance subtracting the predetermined distance from the distance in the direction perpendicular to the substrate surface between the rib top surface and the substrate surface.

In this embodiment, a distance between the substrate surface and the mold convex surface becomes a predetermined value when the mold is positioned as facing to the substrate so that the rib top surface and the mold concave bottom surface come into contact with each other. Therefore, it is possible to very easily set the distance between the substrate surface and the mold convex surface to a predetermined value by using the mold as discussed in this embodiment.

The seventh embodiment of the method for manufacturing a substrate for a display panel according to the present invention is the manufacturing method comprising the following steps before the step 1: a substrate forming step for forming the substrate having the rib and the substrate surface by pressing the mold in which the injection inlet opened on the mold convex surface is filled with a sealing material onto the substrate material, and removal step for removing the sealing material existing in the injection inlet after the substrate forming step.

In this embodiment, the mold for forming the electrode is used as a stamper for forming the substrate convex/concave shape. In this case, the injection inlet for the electrode material must be filled in order to use the mold as the stamper, whereas the injection inlet must be opened in order to inject the electrode material.

In this embodiment, after forming the substrate convex/concave shapes composed of the rib and the substrate surface by using this mold, the electrode can be formed by removing the sealing material without detaching the mold from the substrate, or the electrode can also be formed by detaching the mold from the substrate for removing the sealing material, followed by mounting the mold on the substrate again.

Furthermore, in the case of removing the sealing material without detaching the mold from the substrate, when the ribs are formed discontinuously and the electrodes in the regions partitioned by the ribs are electrically coupled to one another, the sealing material can be removed by uniformly injecting a removal solution and then make it dried while the mold is not detached from the substrate, but is slightly spaced therefrom.

The eighth embodiment of the method for manufacturing a substrate for a display panel according to the present invention is the manufacturing method in which the substrate forming step is performed by using the mold in which the injection inlet is filled with a photosensitive positive resist as the sealing material; and the removal step is performed by removing the sealing material with the light irradiation and subsequent exfoliation (development).

In this embodiment, since the photosensitive positive resist is used to seal the injection inlet, the sealing material can be removed by the step of light irradiation and subsequent exfoliation (development) without detaching the mold from the substrate. Therefore, a substrate for a display panel in which the electrode is provided on the substrate surface partitioned by the rib can be manufactured efficiently and at low cost.

The ninth embodiment of the method for manufacturing a substrate for a display panel according to the present invention is the manufacturing method in which the mold is positioned as facing to the substrate in which the ribs are formed discontinuously and have a certain clearance in the vicinity of a virtual point where the ribs intersect to each other when arranged in lattice-like configuration at the step 1; and the electrode material is injected from the injection inlet provided at the position corresponding to such clearance on the mold convex surface at the step 2.

In this embodiment, when using the substrate in which the ribs are formed discontinuously and have a certain clearance in the vicinity of a virtual intersection point of the ribs when arranged in lattice-like configuration, the clearance region can be utilized to provide the injection inlet for the electrode material. It is thus possible to reduce the number of the injection inlet provided in the mold. Further more, the injection point of the electrode material can be located at the place other than the display region of the image, so that a negative influence on the display can be minimized.

The tenth embodiment of the method for manufacturing a substrate for a display panel according to the present invention is the manufacturing method in which the mold is positioned as facing to the substrate that has a certain clearance in the region other than the region where the ribs arranged in lattice-like configuration intersect to each other at the step 1; and the electrode material is injected from the injection inlet provided at the position corresponding to such clearance on the mold convex surface at the step 2.

In this embodiment, when using the substrate which has a certain clearance in the region other than the region where the ribs arranged in lattice-like configuration intersect to each other, the clearance region can be utilized to provide the injection inlet for the electrode material. It is thus possible to reduce the number of the injection inlet provided in the mold. Further more, the injection point of the electrode material can be located at the place other than the display region of the image, so that a negative influence on the display can be minimized.

The eleventh embodiment of the method for manufacturing a substrate for a display panel according to the present invention is the manufacturing method in which the step 1 is performed by using the mold having an air vent hole provided on the mold concave bottom surface.

In order to inject the electrode material to form an electrode, air existing between the mold and the substrate must be vented to the outside. In this embodiment, it is possible to execute an effective air venting without affecting the formation of the electrode by providing an air vent hole on the mold concave bottom surface.

The twelfth embodiment of the method for manufacturing a substrate for a display panel according to the present invention is the manufacturing method in which the step 1 is performed by using the mold having a hollow portion provided on the side surface of the convex portion that connects the mold convex surface and the mold concave bottom surface.

In this embodiment, by providing the hollow portion on the side surface of the convex portion connecting the mold convex surface and the mold concave bottom surface, it is possible to capture the electrode material traveling between the rib side surface and the side surface of the convex portion of the mold due to the capillarity. Thus it can effectively suppress the upper movement of the electrode material due to the capillarity, thereby effectively preventing the electrode material from forming the film on the rib side surface and the rib top surface of the substrate.

The thirteenth embodiment of the method for manufacturing a substrate for a display panel according to the present invention is the manufacturing method in which the step 1 is performed by using the mold having the tapered shaped side surface of the convex portion that connects the mold convex surface and the mold concave bottom surface.

In this embodiment, it is preferable that the taper shape is formed so that the clearance to the rib side surface of the substrate becomes larger as moving from the mold convex surface to the mold concave bottom surface. According to this embodiment, by forming the side surface of the convex portion that connects the mold convex surface and the mold concave bottom surface into a tapered shape, it is possible to capture the electrode material traveling between the rib side surface and the side surface of the convex portion of the mold due to the capillarity. Thus it can effectively suppress the upper movement of the electrode material due to the capillarity, thereby effectively preventing the electrode material from forming the film on the rib side surface and the rib top surface of the substrate.

An embodiment of a display panel according to the present invention is a display panel provided with the substrate for the display panel which is manufactured by any one of the manufacturing methods described above.

According to this embodiment, there can be obtained a substrate for the display panel on which the electrode is provided on the substrate surface partitioned by the ribs.

An embodiment of a display panel according to the present invention is a display device that is provided with the display panel mentioned above and displays an image on the display panel.

According to this embodiment, there can be obtained a display device that is provided with the display panel in which the electrode is provided on the substrate surface partitioned by the ribs.

EFFECT OF THE INVENTION

As described above, in the method for manufacturing a substrate for a display panel according to the present invention, the mold having convex/concave shapes is positioned as facing to the substrate so as to be fitted to the convex/concave shapes of the substrate, and the electrode material is injected from the injection inlet opened on the mold convex surface, thereby enabling to manufacture the substrate for a display panel which is provided with the electrode on the substrate surface partitioned by the ribs.

Additionally, a display panel provided with the substrate for the display panel which is manufactured by any one of this manufacturing methods and a display device that is provided with this display panel can be obtained at low cost and with improved yields.

DESCRIPTION OF THE ILLUSTRATED EMBODIMENTS

The description will be made below regarding the embodiments for manufacturing a substrate for a display panel, and the embodiments of a display panel provided with the substrate for a display panel manufactured by this manufacturing method according to the present invention, with referring to the drawings.

(Description of One Embodiment of the Display Panel According to the Present Invention)

Figure 1:
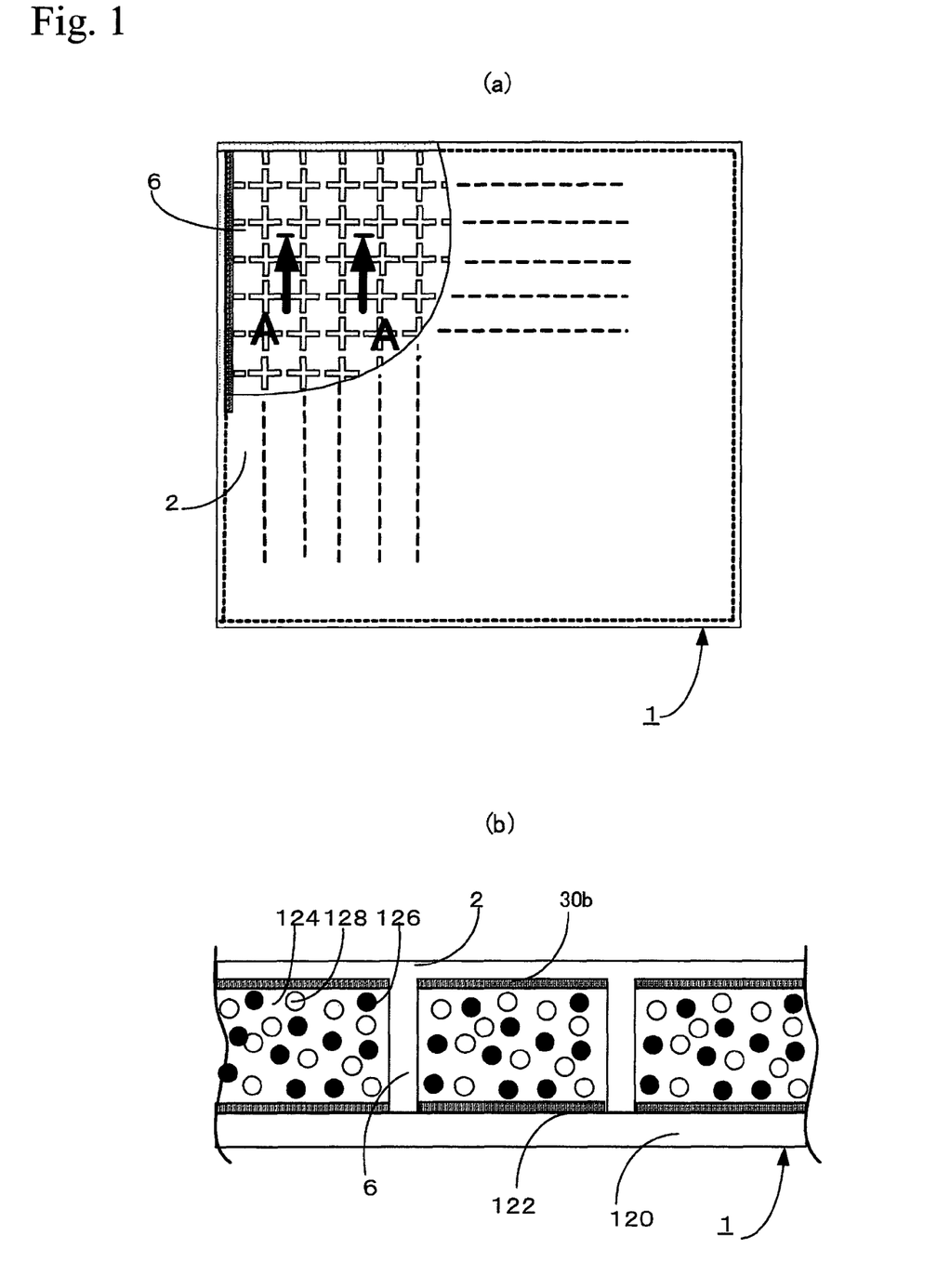
FIG. 1 is a cross sectional view schematically showing a structure of an embodiment of a display panel provided with a panel for a display substrate manufactured by a method for manufacturing a substrate for a display panel according to the present invention.

First, the description will be made regarding one embodiment of a display panel provided with a panel for a display substrate that is manufactured by the method for manufacturing a substrate for a display panel of the present invention. This embodiment describes, but not limited to, an electrophoretic display panel as an example. Here, FIG. 1(a) is a plan view of the display panel according to the present invention viewing from the display surface side, which shows the inside of a substrate 2 of the display side surface exposed by cutting out a part thereof. As is obvious from the cutout portion in FIG. 1(a), a display panel 1 includes a plurality of ribs 6 for partitioning display regions that are formed in a cross-shape in viewing from the display side, and a plurality of approximately square display regions are formed which is partitioned by the ribs 6. That is, in the case of forming the ribs 6 in cross-shape, the ribs 6 are not continuous in the region between points where the ribs 6 cross perpendicular to each other, and have a certain clearance.

Also, FIG. 1(b) is a cross sectional view viewing from an arrow A in FIG. 1(a), which schematically shows the inner structure of the display panel 1. The upper surface in FIG. 1(b) is the display surface.

As shown in FIG. 1(b), the display panel 1 is mainly composed of the substrate (display substrate) 2 of the display surface side provided with a common electrode 30b and the ribs 6 manufactured by the manufacturing method of the present invention, and a substrate (back substrate) 120 of the backside provided with a pixel electrode 122. In this embodiment, the display panel 1 is partitioned by the ribs 6 for each pixel and the individual pixel electrode 122 is provided in each region partitioned by the ribs 6 in order to prevent the uneven distribution of the charged particles in a display medium to achieve a clear displaying. However, it is not limited thereto embodiment, but a plurality of pixel electrodes 122 can be provided in the region partitioned by the rib 6.

In addition, in the substrate 2, the electrode is provided in the portion in which the ribs 6 are not continuous, so that the electrodes in the regions partitioned by the ribs 6 are electrically connected with one another to form the common electrode 30b. The common electrode 4 and the pixel electrode 122 face to each other with a distance of the height of the ribs 6, and a display medium composed of a charged particle 126, a charged particle 128, and a dispersion medium 124 composed of water or gas is filled in an enclosed space formed between the common electrode 4 and the pixel electrode 122.

In this embodiment, the black charged particle 126 is charged positively, and the white charged particle 128 charged negatively.

In FIG. 1, when the potential of the common electrode 30b on the side of the substrate (display substrate) 2 is used as the reference potential to apply a predetermined voltage to the pixel electrode 122 so that the substrate (back substrate) 120 side becomes positive so as to generate a sufficient electric field, the black charged particle 126 that is positively charged is distributed in the vicinity of the substrate (display substrate) 2, whereas the white charged particle 128 that is negatively charged is distributed in the vicinity of the substrate (back substrate) 120. The gradation is defined by the average distributions of the black charged particle 126 and the white charged particle 128 in the display portion, and thus black is displayed on the substrate (display substrate) 2 in this case.

Further, when the potential of the common electrode 30b on the side of the substrate (display substrate) 2 is used as the reference potential to apply a predetermined voltage to the pixel electrode 122 so that the substrate (back substrate) 120 side becomes positive so as to generate a sufficient electric field, the white charged particle 128 that is positively charged is distributed in the vicinity of the substrate (display substrate) 2, whereas the black charged particle 126 that is negatively charged is distributed in the vicinity of the substrate (back substrate) 120. The gradation is defined by the average distributions of the black charged particle 126 and the white charged particle 128 in the display portion, and thus white is displayed on the substrate (display substrate) 2 in this case.

Furthermore, when the potential of the common electrode 30b on the side of the substrate (display substrate) 2 is used as the reference potential to adjust the magnitude and time of the voltage to be applied to the pixel electrode 122 so that the black charged particle 126 and the white charged particle 128 are located at a intermediate position between the substrate (display substrate) 2 and the substrate (back substrate) 120, both the black charged particle 126 and the white charged particle 128 can be viewed from the substrate (display substrate) 2, which thus makes the gradation gray. In this case, gray with a desired darkness can be displayed by changing the degrees of the distributions of the charged particles 126 and 128.

As described above, the gradation is controlled for each pixel based on the image data, so that a desired image can be displayed on the display panel 1.

(Description of One Embodiment of the Method for Manufacturing the Substrate for the Display Panel)

Next, the description will be made regarding one embodiment of the method for manufacturing the substrate for the display panel according to the present invention. In addition, while this embodiment shows the case of manufacturing the substrate used for an electrophoretic display panel and a liquid crystal display panel, it not limited to this case.

Figure 2:
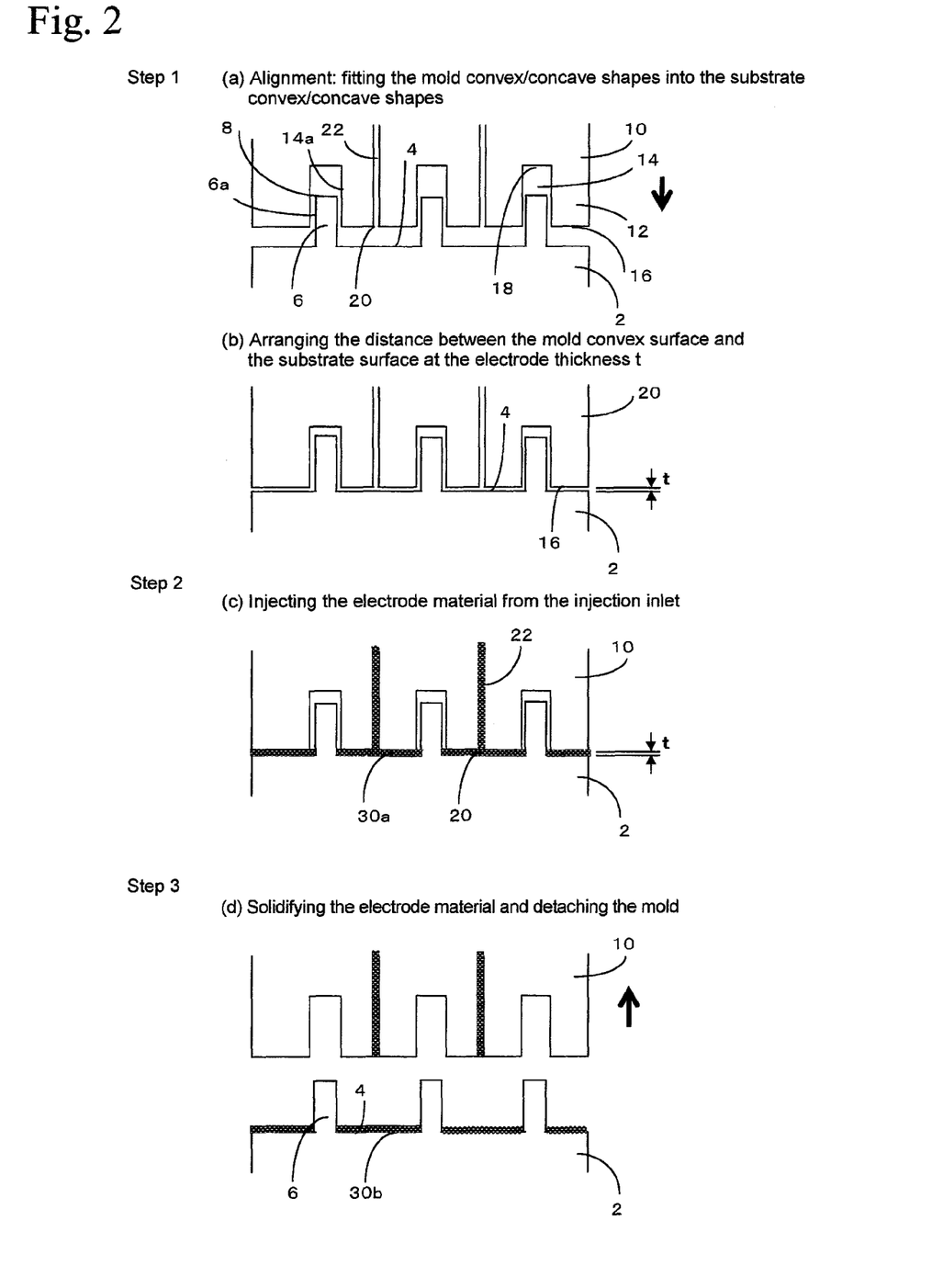
FIG. 2 is a cross sectional view schematically showing each manufacturing step of an embodiment of a method for manufacturing a substrate for a display panel according to the present invention.

In this embodiment, as shown in FIG. 2(a), the substrate 2 on which the convex/concave shapes composed of the ribs 6 and the substrate surface 4 is used and the electrode can be provided in each region of the substrate surface 4 partitioned by the ribs 6. In addition, while using the substrate 2 having the convex/concave shapes formed by embossing by a stamper, this embodiment is not limited thereto, but can use the substrate 2 having the convex/concave shapes formed by other desired methods.

<Description of Step 1>

First, as shown in FIG. 2(a), the substrate 2 having the convex/concave shapes composed of the ribs 6 and the substrate surface 4 that is the region other than the ribs 6 in the substrate 2, and the mold 10 having the convex/concave shapes that are inversed to the convex/concave shapes of the substrate 2 are prepared. With regard to the surface shape of the mold 10, if the regular lattice-like ribs 6 (the ribs are not continuous and have a clearance) shown in FIG. 1(a) are formed on the substrate 2, the mold 10 also has a regular lattice-like concave portion 14 (the portion corresponding to the rib 6) as shown in FIG. 1(a), and the square portion surrounded by the concave portion 14 is a convex portion 12.

Then, the mold 10 is brought down toward the substrate 2 until it reaches the position shown in FIG. 2(b) so that the convex/concave shapes of the mold 10 fit to the convex/concave shapes of the substrate 2 (refer to an arrow in FIG. 2(a)).

In addition, while forming the regular lattice-like ribs 6, this embodiment is not limited thereto, but other desired arrangement can be taken such as the partitioned regions arranged in a staggered configuration or taken a honeycomb configuration, or the like.

Here, as the dimension of the substrate 2 used in this embodiment, when the substrate 2 is provided with the regular lattice-like ribs 6, it is exemplified as a dimension that a side of the region partitioned by the ribs 6 is 50 μm to 500 μm and the height of the rib 6 is 5 μm to 50 μm. However, it is not limited thereto, but any other dimensions can be used. Further, as the material of the substrate 2, a desired material can be used such as resin.

The mold 10 has the convex/concave shapes composed of the convex portion 12 and the concave portion 14. The concave portion 14 has a mold concave bottom surface 18 at the bottom thereof, and the convex portion 12 has a mold convex surface 16 on the convex-shaped top surface located furthest from the mold concave bottom surface 18.

Therefore, when the mold 10 is mounted on the substrate 2, the mold convex surface 16 of the convex portion 12 faces to the substrate surface 4 so that the mold concave bottom surface 18 of the concave portion 14 faces to a rib top surface 8 that is the top surface of the rib 6. In addition, while the substrate surface 4, the rib top surface 8, the mold convex surface 12 and the mold concave bottom surface 18 have their own flat surface shapes, this embodiment is not limited thereto, but it can be considered that the rib top surface 8 and the mold concave bottom surface 18 may have curved surface shape. Furthermore, although the shape of the mold convex surface 12 facing to the substrate surface 4 is preferably a flat shape in general, it is considered that the mold convex surface 12 has the curved surface corresponding to the distribution of the thickness of the electrode when the electrodes to be formed have inconstant thicknesses.

The dimension of the mold 10 used in this embodiment is defined corresponding to the dimension of the substrate 2. Also, any material can be used as the material of the mold 10 such as metal, resin, ceramic, glass or the like, and an optimal material can be specified considering the conditions such as the load, temperature, corrosion resistance, dimensional accuracy, or the like.

In this embodiment, when the convex/concave shapes of the mold 10 is fit to the convex/concave shapes of the substrate 2, it is configured that, but not limited thereto, a certain clearance can be made between the side surface 14a of the concave portion 14 of the mold 10 and the side surface 6a of the rib 6 of the substrate 2. It can be considered that the side surface 14a of the concave portion 14 of the mold 10 and the side surface 6a of the rib 6 of the substrate 2 are fitted to each other without making a clearance. In particular, when the mold 10 is used as a stamper for forming the convex/concave shapes of the substrate 2, it can be considered that a certain surface pressure is generated between the side surface 14a of the concave portion 14 of the mold 10 and the side surface 6a of the rib 6 of the substrate 2. Therefore, considering detaching the mold 10 from the substrate 2, a mold release agent is preferably applied on the contact surface.

In this embodiment, as shown in FIG. 2(a), the substrate 10 is brought down toward the substrate 2 with aligning the substrate and the mold 10 each other. As shown in FIG. 2(b), the mold 10 is arranged above the substrate 2 so that the distance between the substrate surface 4 and the mold convex surface 16 conforms to a thickness t of the electrode to be formed. Here, 10 to 500 nm can be exemplified as the thickness t of the electrode, but not limited thereto because the optimal value varies corresponding to a resistance value and a degree of electrical migration of the electrode material to be used, as well as the area of the electrode.

Figure 3:
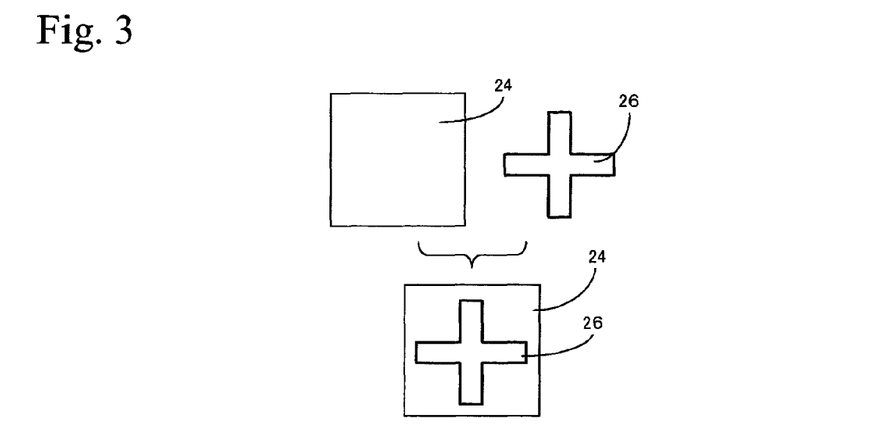
FIG. 3 shows an example of a positioning mark for positioning between a mold and a substrate.

Here, as the method for aligning the mold 10 and the substrate 2, it can be considered, for example, that positioning marks 24 and 26 are used as shown in FIG. 3. As an example of using the positioning marks 24 and 26, it is considered as follows: the box-shaped mark 24 is provided at two corner portions of the substrate 2 and the cross mark 26 is provided at two corner portions of the mold 10 corresponding to those of the substrate 2; and then the positioning marks 24 and 26 are aligned (refer to lower figure of FIG. 3) while observing the marks with a microscope from the backside of the mold 10 (from the upper side of FIG. 2(a)). Further, an automatic recognition system can be used to carry out the alignment so that the cross mark 26 is arranged to be equally distributed in the box-shaped mark 24. In addition, the method for aligning is not limited thereto, but any other method can be used.

<Method for Setting the Distance Between the Substrate Surface 4 and the Mold Convex Surface 16>

Figure 6:
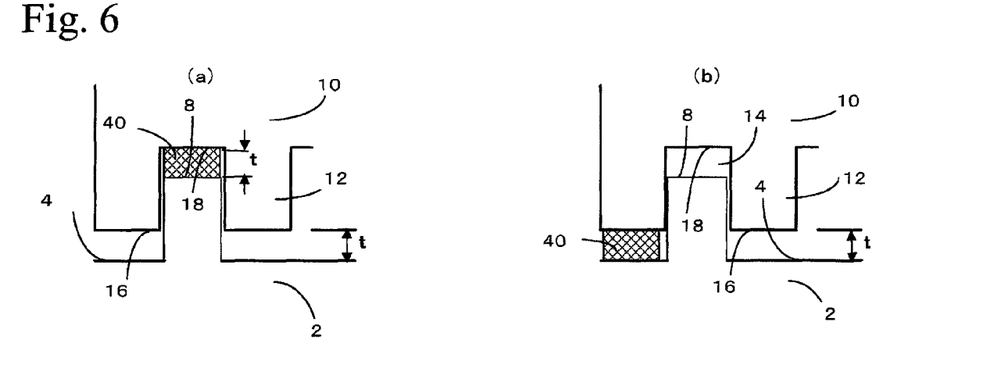
FIG. 6 is a cross sectional view schematically showing an embodiment of setting a distance between a substrate surface and a mold convex surface.

Here, as the method for arranging the mold 10 above the substrate 2 so that the distance between the substrata surface 4 and the mold convex surface 16 conforms to t, the method for using a spacer 40 can be considered as shown in FIG. 6. In the embodiment shown in FIG. 6, there is used the mold 10 in which the distance between the mold convex surface 16 and the mold concave surface 18 of the mold 10 (i.e., the depth of the concave portion 14 of the mold 10) and the distance between the substrate surface 4 and the rib top surface 8 of the substrate 2 (i.e., the height of the rib 6) are identical to each other. The thickness of the spacer 40 conforms to the thickness t of the electrode to be formed.

Then, the further detailed description will be made regarding the method for setting the distance between the substrate surface 4 and the mold convex surface 16.

<<Description of the Method 1 for Setting the Distance t>>

First, the method for setting the distance t shown in FIG. 6 will be described. In the method for setting shown in FIG. 6(a), the spacer 40 is inserted between the rib top surface 8 and the mold concave bottom surface 18, so that the distance between the substrate surface 4 and the mold convex surface 16 is set to conform to the thickness t of the electrode to be formed. Further, in the embodiment as shown in FIG. 6(b), the spacer 40 is placed on the substrate surface 4 where no electrode is provided, so that the distance between the substrate surface 4 and the mold convex surface 16 is set to conform to the thickness t of the electrode to be formed.

In addition, while the above-mentioned setting method uses the mold 10 in which the depth of the concave portion 14 of the mold 10 conforms to the height of the rib 6 of the substrate 2, it is not limited thereto. The mold 10 can have any other dimensions in the depth of the concave portion 14. In this case, the distance between the substrate surface 4 and the mold convex surface 16 can conform to the thickness t of the electrode to be formed by using the spacer 40 having the thickness corresponding to the depth respectively. Furthermore, a location to place the spacer 40 is not limited to the above, but it can be considered that, for example, the spacer 40 is placed on a certain surface on which the substrate 2 is installed and the mold 10 is mounted thereon.

Moreover, when the convex/concave shapes of the substrate 2 are formed using the stamper, the spacer can be formed at the same time. As described above, the distance between the mold convex surface 16 and the substrate surface 4 can easily conform to the thickness t of the electrode to be formed by using the spacer.

<Description of the Method 2 for Setting the Distance t>

Figure 7:
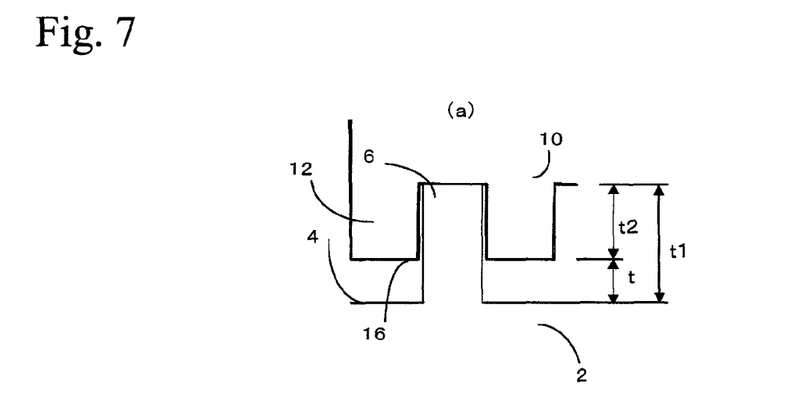
FIG. 7 is a cross sectional view schematically showing another embodiment of setting a distance between a substrate surface and a mold convex surface.

As the method for setting the distance t, it can be considered not only the setting method described above, but also the setting method as shown in FIG. 7. In the setting method shown in FIG. 7, there can be used the mold 10 in which a distance t2 between the mold convex surface 16 and the mold concave bottom surface 18 (i.e., the depth of the concave portion 14) takes the value obtained by subtracting the thickness t of the electrode to be formed from the distance t1 between the rib top surface 8 and the substrate surface 4 (the height of the rib 6). Namely, the mold 10 that have the relationship as follows is used.

$t=t1-t2$

Then, the mold 10 is positioned as facing to the substrate 2 so that the rib top surface 8 and the mold concave bottom surface 18 come into contact with each other, and thus the distance between the substrate surface 4 and the mold convex surface 16 can conform to the thickness t of the electrode to be formed.

As described above, the distance between the mold convex surface 16 and the substrate surface 4 can easily conform to the thickness t of the electrode to be formed by using the mold 10 having the depth $t2(=t1-t)$ of the concave portion 14.

<Description of Step 2>

Next, at step 2, a liquid electrode material 30a is injected from an injection inlet 20 opened on the mold convex surface 16 of the mold 10, as shown in FIG. 2(c). In this embodiment, a transparent conducting material such as ITO (Indium Tin Oxide) is used as the electrode material 30. The liquid electrode material 30a flows in a channel 22 provided in the mold 10, and then is injected from the injection inlet 20 into the space between the substrate surface 4 and the mold convex surface 16 positioned with the distance t. In addition, while this embodiment uses the transparent conducting material as the electrode material 30 in order to use as the common electrode, it is not limited thereto. When the separate electrode is provided in the region surrounded by the ribs 6, it is possible to use a metallic material such as copper and silver, an organic conducting material such as polythiophene and pentacene, dispersion liquids and solutions containing a metallic material and an organic conducting material, and any other materials.

Furthermore, when the electrode material 30a is injected, it is more preferable to discharge the air existing in the space between the substrate surface 4 and the mold convex surface 16 to the outside, and thus the mold 10 is preferably provided with an air vent hole. The position to provide the air vent hole will be described below using FIG. 10 (the reference numeral 52).

<Description of Step 3>

Next, at step 3, the injected electrode material 30a is solidified to form a solidified electrode material layer (i.e., the electrode) 30b as shown in FIG. 2(d), and then the mold 10 is detached from the substrate 2 (refer to an arrow in FIG. 2(d)). Therefore, the electrode 30b having the thickness t can be formed in each region of the substrate surface 4 partitioned by the ribs 6. At the time of detaching the mold, it is possible to suppress the generation of a burr of the solidified electrode material layer 30 by, for example, applying an ultrasonic vibration. Also, using the mold release agent is effective, as described above.

In addition, regarding the solidification of the electrode material 30a, the mold can be detached in the half-solidified condition if the mold 10 can be detached from the substrate 2 without damaging the formed electrode material layer 30b.

As described above, according to this embodiment, the mold having the convex/concave shapes is positioned as facing to the substrate 2 to fit to the convex/concave shapes of the substrate 2, and then the electrode material 30b is injected from the injection inlet 20 opened on the convex surface 16 of the mold 10. Thus, it is possible to manufacture the substrate 2 for the display panel which have the electrode 30b in each region of the substrate surface 4 partitioned by the ribs 6 without any complicated manufacturing steps, at low cost and with improved yields.

(Description of Other Embodiments of the Method for Manufacturing a Substrate for a Display Panel)

Figure 4:
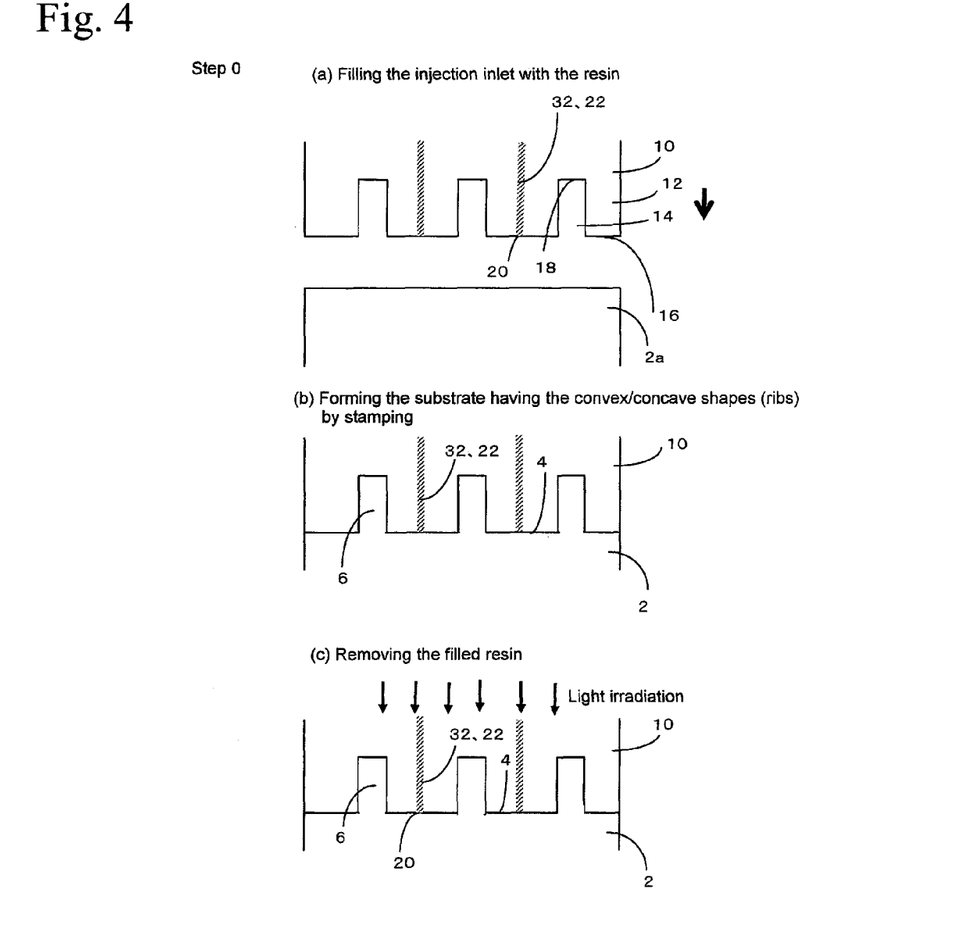
FIG. 4 is a cross sectional view schematically showing each manufacturing step of another embodiment of a method for manufacturing a substrate for a display panel according to the present invention, particularly showing a step for forming a substrate having convex/concave shapes using a mold.
Figure 5:
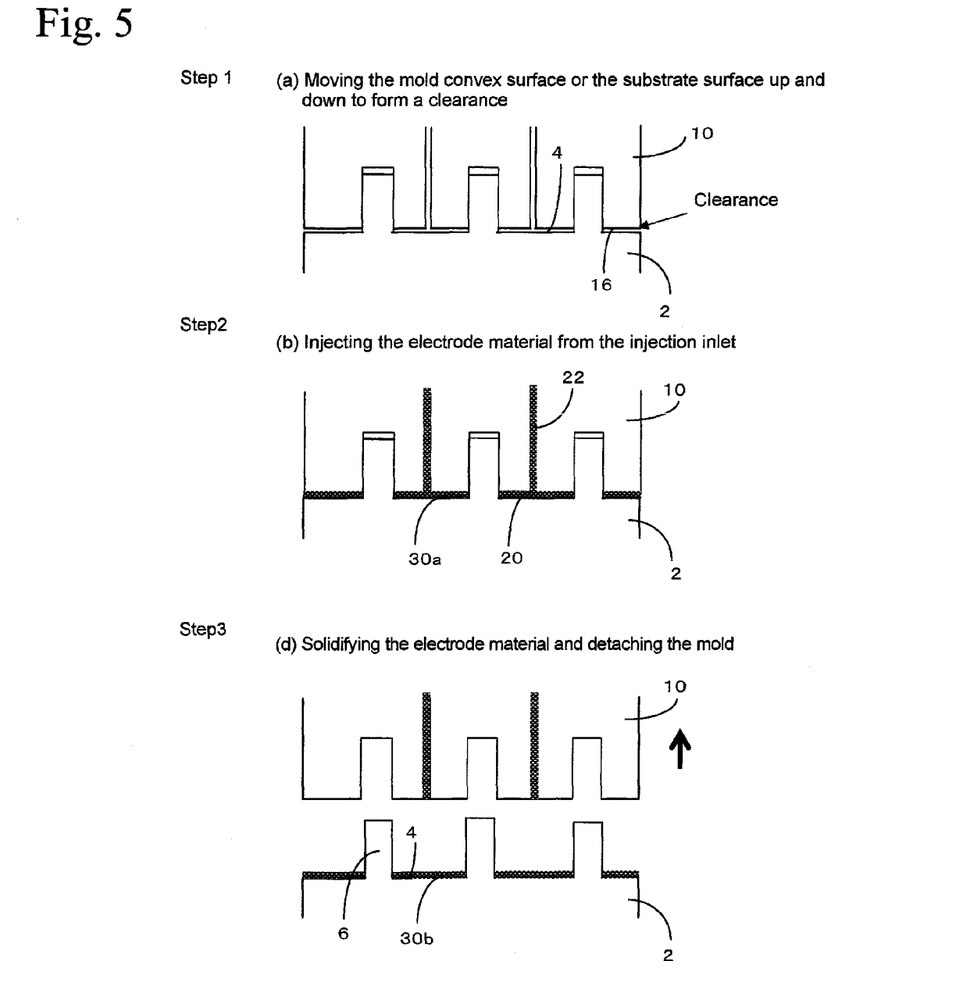
FIG. 5 is a cross sectional view schematically showing each manufacturing step of another embodiment of a method for manufacturing a substrate for a display panel according to the present invention, particularly showing a step for forming an electrode subsequent to the step shown in FIG. 2.

Next, the description will be made regarding other embodiments of the method for manufacturing a substrate for a display panel according to the present invention using FIGS. 4 and 5. Here, FIGS. 4 and 5 are cross sectional views schematically showing each manufacturing step associated with the method for manufacturing a substrate for a display panel according to the present invention, being similar to FIG. 2.

In this embodiment, the step is carried out as follows: at first, the mold for forming the electrode is used as a stamper to form the convex/concave shapes composed of the rib 6 and the substrate surface 4 in the substrate 2; and then the same mold 10 is used to provide the electrode in each region of the substrate surface 4 partitioned by the ribs 6. Here, a step 0 is shown in FIG. 4 in which the mold 10 is used to form the convex/concave shapes on the substrate 2, and steps 1 to 3 are shown in FIG. 5 in which the electrode is provided in the substrate surface 4 surrounded by the ribs 6. Therefore, FIG. 5 shows the manufacturing steps approximately the same as each manufacturing step shown in FIG. 2 above.

<Description of Step 0>

First, the step 0 for forming the convex/concave shape on the substrate 2 will be described using FIG. 4. As shown in FIG. 4(a), a mold 10 having the convex/concave shapes and a flat-shaped substrate material 2a having no convex/concave shape are prepared.

In this embodiment, although a PEN (polyethylene naphthalate) film, which has excellent heat resistance and insulation performance, is used as the substrate material 2a, it is possible to use the other resin films such as a PES (polyether sulfone) film, and a film member and a flat-shaped member composed of other organic, inorganic, or organic-inorganic complex materials. Here, the material having transparency or translucency is preferable when used as the display surface side substrate, whereas it is not necessarily to be translucent when used as the backside substrate and any colored material can be used.

Further, the mold 10 having the convex/concave shapes composed of the convex portion 12 and the concave portion 14 can has the shape and dimension similar to the mold shown in FIG. 2 above. Furthermore, while the mold 10 in this embodiment is composed of a metallic material for using as the stamper, it is not limited thereto. Any other materials can be used such as resin, ceramic, glass or the like, if the conditions such as the load and temperature are suitable for the materials.

If the substrate material 2a is pressed by the mold 10 in which the injection inlet 20 provided on the mold convex surface 18 of the mold 10 keeps opening, a defect will be made in the region corresponding to the injection inlet 20 of the substrate 2 to be formed. Then, in order to prevent it, the work in which the injection inlet 20 is filled with a sealing material 32 shall be performed before pressing by the mold 10. More specifically, for example, it can be achieved as follows: the liquid sealing material 32 is injected into the channel 22 of the electrode material with applying pressure; and the injection inlet 20 is finished using a squeegee or the like so that the injection inlet 20 and the surrounding mold convex surface 16 have an even surface. Also, in this embodiment, a resin material, particularly a photosensitive positive resist is used as the sealing material 32 considering removing the sealing material 32 at the later step. However it is not limited thereto, but any other materials can be used as the sealing material 32.

Next, the substrate material 2a is heated until the material is softened, and also the mold 10 is separately heated. The substrate material 2a is then placed on a stage of a press device, and then the mold 10 is attached to a holder of the press device to press the substrate material 2a by the mold 10, as indicated by an arrow in FIG. 4(a). When pressing, the holder of the press device (i.e., the mold 10) can be brought down as shown in FIG. 4(a), while the stage of the press device (i.e., substrate material 2a) can be raised.

The pressing makes it possible to form the substrate 2 having the convex/concave shape composed of the rib 6 and the substrate surface 4, as shown in FIG. 4(b). The mold 10 and the formed substrate 2 are then cooled.

Next, as shown in FIG. 4(c), light is irradiated from above without detaching the mold 10 from the substrate 2 to expose the photosensitive positive resist (sealing material) 32 filled in the channel 22 thereby being soluble in a developing solution. Then, the photosensitive positive resist (sealing material) 32 in the channel 22 that is brocking the injection inlet 20 is removed by dissolving with the developing solution. More specifically, when the filling depth of the photosensitive positive resist (sealing material) 32 is 1 μm or more, the steps of exposing photosensitive positive resist, dissolving the exposed portion with the developing solution, rinsing with a rinse solution, and drying are repeated several times, thereby enabling the filled photosensitive positive resist (sealing material) 32 to be removed completely.

As described above, the condition in which the convex/concave shapes of the mold 10 fit to the convex/concave shapes of the substrate 2 is formed. In addition, this condition is the same as that shown in FIG. 2(a), and thus it can be said that the step 1 begins.

Subsequent to the step 0 shown in FIG. 4, the electrode 30b can be formed in each region of the substrate surface 4 partitioned by the rib 6 at steps 1 to 3 shown in FIG. 5. Since the steps shown in FIG. 5 are approximately similar to that shown in FIG. 2, the description below will be focused mainly on the different points.

As shown in FIG. 5(a), the holder side of the press device to which the mold 10 is attached is raised or the stage of the press device to which the substrate 2 is attached is brought down, and then a certain clearance is provided between the mold convex surface 16 and the substrate surface 4. In this case, it is important to move the mold 10 or the substrate 2 in the vertical direction while keeping the mold 10 and the substrate 2 horizontal. Also, it is preferable to previously apply the treatment by the mold release agent to the mold 10 before the mold 10 presses the substrate 2a in order to improve lubricant property between the mold 10 and the substrate 2.

<Description of Step 2>

Next, the liquid electrode material 30a is injected between the substrate surface 4 and the mold convex surface 16 from the injection inlet 20 opened by removing the sealing material 32, as shown in FIG. 5(b). In this embodiment, the required injection amount of the electrode material is previously calculated corresponding to the thickness t of the electrode to be formed and the electrode material 30a is injected with the required injection amount, thereby forming the electrode having a desired thickness. Also, it is possible to combine the method for injection the electrode material 30a with the required injection amount and the method for conforming the distance between the above mentioned substrate surface 4 and the mold convex surface 16 to the thickness t of the electrode to be formed.

<<Other Method for Controlling the Thickness of the Electrode>>

Figure 8:
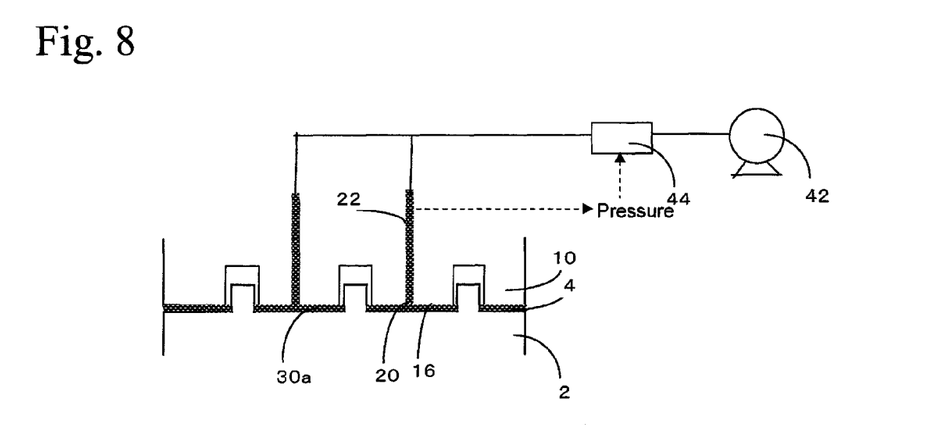
FIG. 8 is a cross sectional view schematically showing an embodiment of forming an electrode with a desired thickness by adjusting a pressure applied to an electrode material to be injected.

As the other method for controlling the thickness of the electrode to a desired value, there is considered a method in which an injection pressure of the electrode material 30a is measured and the injection is stopped when the injection pressure reaches a predetermined value, thereby controlling the thickness of the electrode to a desired thickness, as shown in FIG. 8.

In the embodiment shown in FIG. 8, a pump 42 is used to inject the electrode material 30a between the substrate surface 4 and the mold convex surface 16. When the measured injection pressure exceeds a predetermined value, a control valve 44 is closed to stop the injection of the electrode material 30a.

<<Description of the Other Embodiments of the Injection Device>>

In the embodiment shown in FIG. 8, while the pump 42 is used to inject the electrode material 30a, it is not limited thereto. For example, an injection device 34 shown in FIG. 9 can be used for injection.

Figure 9:
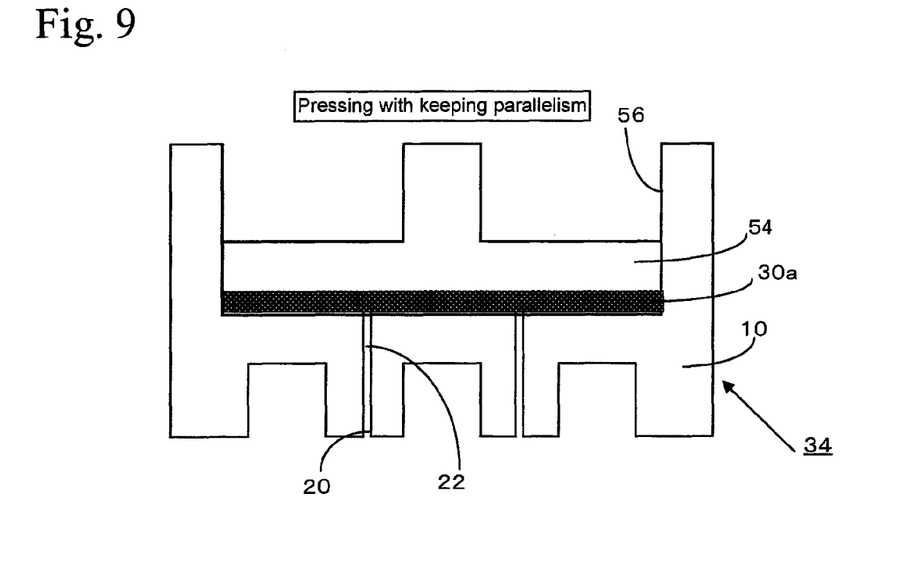
FIG. 9 is a cross sectional view schematically showing an embodiment of an injection device for injecting an electrode material.

In the injection device 34 shown in FIG. 9, a guide surface 56 is formed upside of the mold 10, and a piston 54 is arranged therein which slides up and down along the guide surface 56. The guide surface 56 enables the piston 54 to move vertically while keeping itself parallel when the piston 54 is pressed from the upside. The electrode material 30a is filled between the under surface of the piston 54 and the top surface of the mold 10, and then piston 54 is brought down, thereby making the electrode material 30a flow downward in the channel 22 and be injected into the space between the substrate surface 4 and the mold convex surface 16. As the method for bringing down the piston 54, it can be carried out manually, or by using an actuator.

Further, when the device 34 is used, a pressure gauge is used to measure the injection pressure, and pressing of the piston 54 is stopped when the measured injection pressure exceeds a predetermined value, thereby setting the thickness of the electrode to a desired value. In addition, the injection device 34 can be used any other methods for forming the electrode.

Next, as shown in FIG. 5(c), the electrode material 30a is solidified to form the electrode 30b, and then the mold 10 is detached from the substrate 2 (refer to an arrow in FIG. 5(c)). More specifically, the holder side of the press device to which the mold 10 is attached is raised or the stage of the press device to which the substrate 2 is attached is brought down, and then the mold 10 or the substrate 2 is moved in the vertical direction while keeping the mold 10 and the substrate 2 horizontal to detach the mold. In this case, it is preferable to previously apply the treatment by the mold release agent to the mold 10. At the time of detaching the mold, it is possible to suppress the generation of a burr of the electrode material by applying an ultrasonic vibration, as described above.

As described above, according to this embodiment, the mold 10 having the convex/concave shapes is firstly used as a stamper to form the substrate 2 having the convex/concave shapes. The same mold 10 is then used to inject the electrode material 30b from the injection inlet 20 opened on the convex surface 16 of the mold 10. Thus it is possible to manufacture the substrate 2 for the display panel which have the electrode 30b in each region of the substrate surface 4 partitioned by the ribs 6 without any complicated manufacturing steps, at low cost and with improved yields.

(Description of the Other Embodiments of the Mold According to the Present Invention)

Next, the other embodiments of the mold according to the present invention will be described. When the electrode material 30a described above is injected between the substrate surface 4 and the mold convex surface 16, the problem arises that the electrode material 30a travels between the side surface 6a of the rib 6 and the side surface 14a of the convex portion 14 of the substrate 2 due to the capillarity, which leads to the adhesion of the electrode material 30b on the side surface 6a of the rib 6 and the rib top surface 8. To deal with this, it is considered to use the mold 10 mentioned below.

<Description of the Other Embodiment 1 of the Mold 10>

As one embodiment of the mold 10 for dealing with the problem described above, the mold 10 as shown in FIG. 10 can be considered which is provided with a hollow portion 50 on the side surface 14a of the concave portion 14. The hollow portion 50 provided on the side surface 14a can capture the electrode material traveling between the side surface 6a of the rib 6 and the side surface 14a of the concave portion 14, and thus it is possible to effectively suppress the phenomenon in which the electrode material 30a rises between the side surface 6a of the rib 6 and the side surface 14a of the concave portion 14 due to the capillarity. This enables the electrode material 30b to be prevented from adhering to the side surface 6a of the rib 6 and the rib top surface 8. In addition, in this embodiment, it is preferable to provide the hollow portion 50 at the position near the substrate surface 4.

Figure 10:
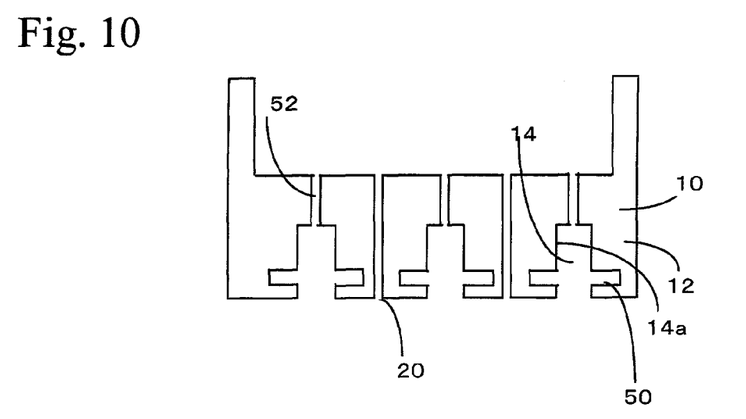
FIG. 10 is a cross sectional view schematically showing an embodiment of a mold for preventing an electrode material from adhering to a side surface or a top surface of a rib.

Further, as shown in FIG. 10, an air vent hole 52 is provided on the mold concave bottom surface 18 of the mold 10. When the electrode material 30a is injected to form the electrode 30b, it is necessary to discharge the air existing in the space between the substrate surface 4 and the mold convex surface 16 to the outside. In this embodiment, providing the air vent hole 52 on the mold concave bottom surface 16 makes it possible to carry out the air venting effectively without affecting the formation of the electrode. In addition, as described above, if a certain clearance is generated between the side surface 14a of the concave portion 14 of the mold 10 and the side surface 6a of the rib 6 of the substrate 2 when the convex/concave shapes of the mold 10 is fitted into the convex/concave shapes of the substrate 2, the air vent hole 52 is applicable to all the molds 10 described above in general.

<Description of the Other Embodiment 2 of the Mold 10>

Figure 11:
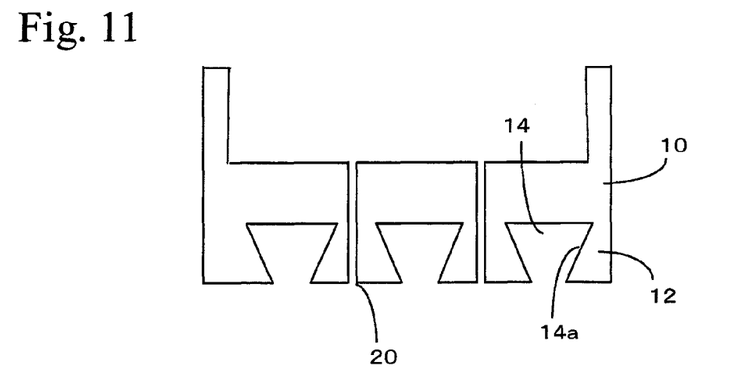
FIG. 11 is a cross sectional view schematically showing another embodiment of a mold for preventing an electrode material from adhering to a side surface or a top surface of a rib.

As the other embodiment of the mold 10 for dealing with the problem described above, the mold 10 as shown in FIG. 11 can be considered in which the side surface 14a of the concave portion 14 is formed into a tapered shape. The side surface 14a takes a tapered shape extending upward, i.e., the shape in which the distance to the side surface 6a of the rib 6 becomes larger as positioning further from the substrate surface 4. The tapered shape can effectively suppress the phenomenon in which the electrode material 30a rises between the side surface 6a of the rib 6 and the side surface 14a of the concave portion 14 due to the capillarity. Therefore, this enables the electrode material 30b to be prevented from adhering on the side surface 6a of the rib 6 and the rib top surface 8.

<Description of the Opening Position of the Injection Inlet of the Electrode Material>

Figure 12:
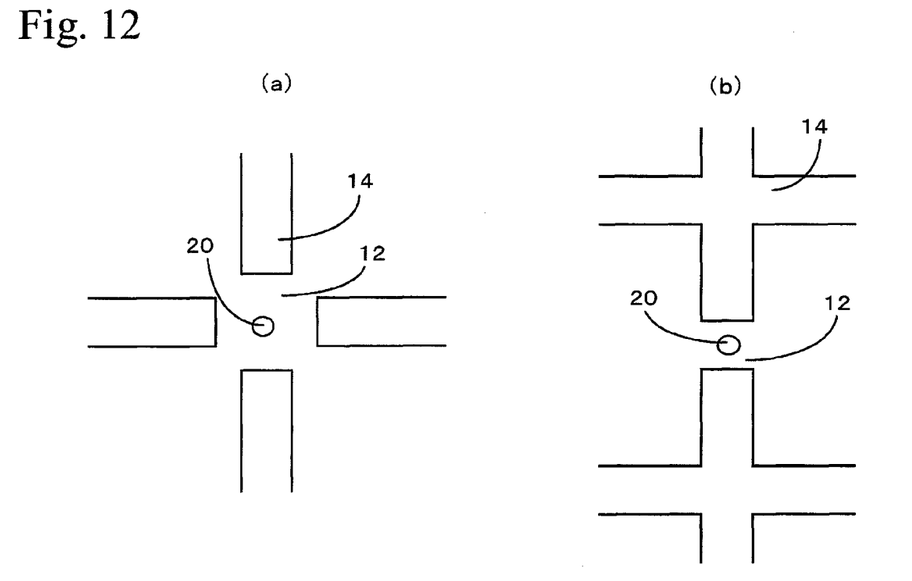
FIG. 12 is a plan view showing an embodiment of a location of an opening of an injection inlet for an electrode material.

Next, the description will be made regarding the opening position of the injection inlet 20 for injecting the electrode material 30a between the substrate surface 4 and the mold convex surface 16. Although it is considered that the injection inlet 20 is provided on the substrate surface 4 as being the display region surrounded by the ribs 6, the electrode 30 b may not be formed uniformly under the influence of the injection inlet 20, which may adversely affect the image display. To deal with this, when using the substrate 2 in which a clearance is formed in the rib 6, it is considered that the mold 10 which has the injection inlet 20 provided at the position corresponding to the clearance is used, as shown in FIG. 12. Here, FIG. 12 is a plan view viewing the mold 10 from the side of the mold convex surface 16.

First, the embodiment shown in FIG. 12(a) will be described. In this embodiment, there is used a mold which corresponds to the substrate in which the ribs are not continuous and have a certain clearance in the vicinity of a virtual intersection point of the ribs when the ribs to be formed are arranged in lattice-like configuration. The mold 10 has the convex/concave shapes composed of the concave portion 14 corresponding to the rib 6 and the convex portion 12 corresponding to the substrate surface 4. Then, the injection inlet 20 is provided at the position corresponding to the clearance that is provided in the region where the ribs 6 intersect to each other. More specifically, the concave portions 14 are not continuous in the vicinity of the virtual point of the concave portions 14 perpendicular to each other, and the injection inlet 20 is provided on the convex portion 12 in the region where the concave portions 14 are discontinuous.

On the other hand, in the embodiment shown in FIG. 12(b), there is used a mold which corresponds to the substrate in which the ribs are not continuous and have a certain clearance in the region between the intersection points of the ribs that intersects perpendicular to each other when the ribs to be formed are arranged in lattice-like configuration. The mold 10 also has the convex/concave shapes composed of the concave portion 14 corresponding to the rib 6 and the convex portion 12 corresponding to the substrate surface 4. Then, the injection inlet 20 is provided at the position corresponding to the clearance that is provided in the region other than the region where the ribs 6 intersects to each other. More specifically, the concave portions 14 are not continuous in the region between the intersection points of the ribs that intersects perpendicular to each other, and the injection inlet 20 is provided on the convex portion 12 in the region where the concave portions 14 are discontinued.

In addition, while the embodiment shown in FIG. 12 shows the rib provided in the regular lattice-like configuration, it is not limited thereto. This is applicable to any other arrangement of the rib such as a honeycomb configuration.

When the clearance is provided in the rib 6 of the substrate 2 as is shown the embodiment in FIG. 12, the electrode material 30a can flow into other regions on the substrate surface 4 partitioned by the ribs 6, thereby enabling the number of the injection inlet 20 provided on the mold 10 to be reduced. Moreover, when the injection inlet 20 for the electrode material 30a is arranged at the clearance portion of the ribs 6, the influence given to the display can be minimized.

In addition, the following method can be considered other than the present invention as a method for providing an electrode on a fine substrate surface surrounded by ribs after forming the rib on the substrate.

As a method for providing an electrode only on the substrate surface surrounded by the rib, using a liftoff process can be considered. When the liftoff process is used, it is necessary to apply a resist on the rib side surface and deposit a metallic film on the substrate surface surrounded by the ribs, followed by removing the resist and the metallic film adhered on the resist. However, it is very difficult to cover only the rib side surface by the resist, and to remove the resist even if the resist can cover the side surface. Moreover, the liftoff process is the manufacturing process that requires a number of steps, which may lead to increase in the manufacturing cost.

As another method for providing an electrode only on the substrate surface surrounded by the rib, using an inkjet process can be considered. When the inkjet process is used, the problem arises that a metallic droplet for forming the electrode does not spread uniformly. In particular, when the pitch for providing the rib becomes narrower, it increases the difficulty. Therefore, the problem arises that the yield of the substrate to be manufactured decreases.

Thus, if the substrate for the display panel provided with the electrode in the region partitioned by the ribs is manufactured by the liftoff or inkjet process without recourse to the manufacturing method of the present invention, the manufacturing cost will be increased and the yield will decrease.

(Description of the Other Embodiments According to the Present Invention)

Using the substrate for the display panel manufactured by the manufacturing method of the present invention makes it possible to provide a variety of display panels that requires low electric power such as an electrophoretic display panel and a liquid crystal display panel. Further, any display device comprising this display panel can be provided.

Furthermore, the embodiments of the method for manufacturing the substrate for the display panel, the display panel provided with the substrate for the display panel manufactured by this manufacturing method, and the display device provided with this display panel are not limited to the embodiments described herein, but a variety of other embodiments are included in the present invention.

REFERENCE NUMERALS

2 Substrate
2a Substrate material
4 Substrate surface
6 Rib
6a Side surface
8 Rib top surface
10 Mold
12 Convex portion
14 Concave portion
14a Side surface
16 Mold convex surface
18 Mold concave bottom surface
20 Injection inlet
22 Channel
24 Box-shaped mark
26 Cross mark
30 Electrode material
30a Liquid electrode material
30b Solidified electrode material, electrode
32 Sealing material
34 Manual injection device
40 Spacer
42 Pump
44 Control vent
50 Depression portion
52 Air vent hole
54 Piston
56 Guide surface

The invention claimed is:

1. A method for manufacturing a substrate for a display panel including a rib and a substrate surface formed on one surface, the substrate surface being the region other than the rib in the substrate and including an electrode provided thereon, the substrate having a substrate convex/concave shape composed of the rib and the substrate surface, comprising:

a step 1 for positioning a mold convex/concave shape that is reversed to the substrate convex/concave shape so that the mold convex/concave shape and the substrate convex/concave shape are fitted to each other, a mold convex surface facing to the substrate surface at a convex portion of the mold convex/concave shape, and with a mold concave bottom surface facing to a rib top surface at a concave portion of the mold convex/concave shape;

a step 2 performed after the step 1, for injecting an electrode material from an injection inlet opened on the mold convex surface; and a step 3 performed after the step 2, for solidifying the electrode material and detaching the mold from the substrate.

2. The method for manufacturing a substrate for a display panel according to claim 1, wherein the electrode material is injected from the injection inlet with a predetermined amount at the step 2.

3. The method for manufacturing a substrate for a display panel according to claim 1, wherein a pressure of injection of the electrode material from the injection inlet is measured and injection of the electrode material is stopped when the measured pressure reaches a predetermined value at the step 2.

4. The method for manufacturing a substrate for a display panel according to claim 1, wherein the mold and the substrate are arranged so as to face to each other on the condition that the mold convex surface and the substrate surface are positioned apart from each other at a predetermined distance at the step 1.

5. The method for manufacturing a substrate for a display panel according to claim 4, wherein a spacer is used for setting the distance between the mold convex surface and the substrate surface to the predetermined distance at the step 1.

6. The method for manufacturing a substrate for a display panel according to claim 4, wherein, at the step 1, the mold is arranged as facing to the substrate so that the rib top surface and the mold concave bottom surface come into contact with each other using the mold in which the distance in the direction perpendicular to the mold convex surface between the mold convex surface and the mold concave bottom surface is the distance subtracting the predetermined distance from the distance in the direction perpendicular to the substrate surface between the rib top surface and the substrate surface.

7. The method for manufacturing a substrate for a display panel according to claim 1, comprising the following steps before the step 1:

a substrate forming step for forming the substrate having the rib and the substrate surface by pressing the mold in which the injection inlet opened on the mold convex surface is filled with a sealing material onto the substrate material, and a removal step for removing the sealing material existing in the injection inlet after the substrate forming step.

8. The method for manufacturing a substrate for a display panel according to claim 7, wherein:

the substrate forming step is performed by using the mold in which the injection inlet is filled with a photosensitive positive resist as the sealing material; and the removal step is performed by removing the sealing material with the light irradiation and subsequent exfoliation.

9. The method for manufacturing a substrate for a display panel according to claim 1, wherein:

the mold is positioned as facing to the substrate in which the ribs are formed discontinuously and have a certain clearance in the vicinity of a virtual point where the ribs intersect to each other when arranged in lattice-like configuration at the step 1; and the electrode material is injected from the injection inlet provided at the position corresponding to such clearance on the mold convex surface at the step 2.

10. The method for manufacturing a substrate for a display panel according to claim 1, wherein:

the mold is positioned as facing to the substrate that has a certain clearance in the region other than the region where the ribs arranged in lattice-like configuration intersect to each other at the step 1; and the electrode material is injected from the injection inlet provided at the position corresponding to such clearance on the mold convex surface at the step 2.

11. The method for manufacturing a substrate for a display panel according to claim 1, wherein the step 1 is performed by using the mold having an air vent hole provided on said mold concave bottom surface.

12. The method for manufacturing a substrate for a display panel according to claim 1, wherein said mold is used at said step 1, the mold having a convex portion provided on said side surface of said convex portion connecting said mold convex surface to said mold concave bottom surface.

13. The method for manufacturing a substrate for a display panel according to claim 1, wherein said mold is used at said step 1, the mold having said tapered shaped side surface of said convex portion connecting said mold convex surface to said mold concave bottom surface.

* * * * *